United States Patent [19]
Takagi et al.

[11] Patent Number: 6,081,796
[45] Date of Patent: Jun. 27, 2000

[54] PROPORTION PREDICTING SYSTEM AND METHOD OF MAKING MIXTURE

[75] Inventors: Hideyuki Takagi, Fukuoka, Japan; Eiji Mizutani; David M. Auslander, both of Berkeley, Calif.

[73] Assignees: Matsushita Electric Industrial Co., Ltd., Osaka-fu; Kansai Paint Co., Ltd., Hyogo-ken, both of Japan; The Regents of the University of California, Oakland, Calif.

[21] Appl. No.: 08/875,399

[22] PCT Filed: Jan. 31, 1995

[86] PCT No.: PCT/US95/00972

§ 371 Date: Nov. 7, 1997

§ 102(e) Date: Nov. 7, 1997

[87] PCT Pub. No.: WO96/24033

PCT Pub. Date: Aug. 8, 1996

[51] Int. Cl.[7] .............................. G06F 15/00; G06F 7/00
[52] U.S. Cl. .................................... 706/1; 706/13; 706/14
[58] Field of Search .................................... 706/1, 13, 14

[56] References Cited

U.S. PATENT DOCUMENTS

| | | | |
|---|---|---|---|
| 5,410,637 | 4/1995 | Kern et al. | |
| 5,424,959 | 6/1995 | Reyes et al. | 702/28 |
| 5,666,816 | 9/1997 | Jeong et al. | 62/154 |
| 5,673,565 | 10/1997 | Jeong et al. | 62/80 |
| 5,813,798 | 9/1998 | Whiffen | 405/52 |

OTHER PUBLICATIONS

K. Chan, Computer–Aided Molecular Design Using Genetic Algorithms, Purdue University Dissertation, May 1994, pp. 40–62.

G. Wyszecki et al., "Color Science: Concepts and Methods, Quantitative Data and Formula", (New York, NY: Wiley 2nd Ed. (1982), pp. 221–222, 785–786.

J.M. Bishop et al., "Application of Neural Networks to Computer Recipe Prediction", Color Research and Application, vol. 16, No. 1, pp. 3–9 (1991).

D. E. Goldberg, "Genetic Algorithms in Search, Optimization and Machine Learning" Addison–Wesley, 1989, pp. 1–57.

L. Davis, "Handbook of Genetic Algorithms", Van Nostrand Reinhold, 1980,, pp. 1–23 and 54–61.

Kim Chwee Ng et al., "Design of Sophisticated Fuzzy logic controllers using genetic algorithms", Fuzzy Systems, 1994. IEEE World Congress on Computational Intelligence., Proceesings of the Third IEEE Conference on, pp. 1708–1712 vol. 3, Jan. 1994.

Hwang, W.R. et al., "An intelligent controller design based on genetic algorithms", Decision and Control, 1993., Proceedings of the 32nd IEEE Conference on, pp. 1266–1267 vol. 2, Jan. 1993.

Man Gyun Na, "Design of a genetic fuzzy controller for the nuclear steam generator water level control", Nuclear Science, IEEE Transactions on, vol:45 4 3, pp. 2261–2271, Aug. 1998.

Lansberry, J.E., "Optimal hydrogenerator governor tuning with a genetic algorithm", Energy Conversion, IEEE Transactions on, vol. 7 4, pp. 623–630, Dec. 1992.

*Primary Examiner*—James P. Trammell
*Assistant Examiner*—Wilbert C. Starks, Jr.
*Attorney, Agent, or Firm*—Greenblum & Bernstein, P.L.C.

[57] ABSTRACT

A proportion predicting system for realizing a predetermined target by mixing a predetermined number of elements at a predetermined proportion. The system includes a target characteristic extractor for extracting a characteristic of the predetermined target; an evaluating means operable upon receipt of proportion vectors, which are represented by the characteristic of the predetermined target and the quantity of each of the elements, respectively, to determine fitnesses of the proportion vectors based on the extracted characteristic of the predetermined target; and a GA processor for predicting the proportion vectors on the basis of the fitnesses according to a genetic algorithm in which the quantity of each of the elements and each of the proportion vectors are represented by a gene and a chromosome, respectively. The proportion vectors, which have been predicted by the GA processor, are inputted to the evaluating means to cause the evaluating means to repeat evaluation of the proportion vectors to determine optimum proportion vectors.

19 Claims, 9 Drawing Sheets

FIG. 1

|  | WHITE | GREEN 1 | GREEN 2 | ... | YELLOW | RED |  |
|---|---|---|---|---|---|---|---|
|  | 0.23 | 0.04 | 0.31 | ... | 0.00 | 0.11 | PROPORTION VECTOR 1 (CHROMOSOME 1) |
|  | 0.11 | 0.14 | 0.20 | ... | 0.02 | 0.24 | PROPORTION VECTOR 2 (CHROMOSOME 2) |
|  | 0.12 | 0.14 | 0.21 | ... | 0.03 | 0.10 | PROPORTION VECTOR 3 (CHROMOSOME 3) |
|  | 0.31 | 0.19 | 0.28 | ... | 0.01 | 0.12 | PROPORTION VECTOR n (CHROMOSOME n) |

PROPORTION PREDICTING SYSTEM AND METHOD OF MAKING MIXTURE

FIELD OF TECHNOLOGY

The present invention relates to a proportion predicting system for predicting a proportion or a mixing ratio at which a plurality of materials, colors, light, acoustic signals, electrical signals, electromagnetic waves or the like are mixed to produce a desired target, and also to a mixture making method for making the desired target by utilization of the proportion predicted by the proportion predicting system.

BACKGROUND ART

In discussing the prior art, reference is made to, for example, the field of color recipe prediction for preparing a color of a particular specification by mixing a plurality of pigments. In the description that follows, original pigments to be mixed to produce the color of the particular specification are referred to as elements. The simplest prior art method for this purpose is that an expert empirically determines the proportion or mixing ratio of the elements to be mixed, by looking at the target color. Another prior art method comprises the steps of analyzing a spectrum of the target color, making a search in a database to find a color which may match with the color of a spectrum closest to the spectrum previously analyzed, and finely adjusting the proportion of the elements making reference to the proportion of the element pigments that has been used to produce the previous color.

A further prior art method is disclosed by, for example, G. Wyszecki and W. S. Stiles in their "Color Science: Concepts and Methods, Quantitative Data and Formula" (New York, N.Y.: Wiley, 2nd ed. (1982)), in which a model mathematically simulating the relationship between the color spectrum and the projected image of the proportion, such as represented by the Kubelka-Munk theory is utilized to determine the proportion from the color spectrum. A more recent prior art method is disclosed by, for example, J. M. Bishop, M. J. Bushnell and S. Westland in their "Application of Neural Networks to Computer Recipe Prediction" (Color Research and Application, Vol. 16, No. 1, pp.3–9, (1991), in which the neural network is taught to output the proportion in response to input of the color spectrum.

In any event, according to the prior art, the element pigments are mixed together according to the proportion so obtained to produce the target color.

While the foregoing discussion is directed to the color recipe, a similar discussion equally applies to the field of perfumery, preparation of food items, design of sound effects, material development or the like.

All of the prior art methods have a common feature in that a color, light or material that satisfies a given specification is produced on a trial and error basis with the use of human sensory perception, experiences and experimental data bases. It will readily be understood that it is not easy to attain high accuracy.

The mathematically simulated model represented by the equations set forth in the Kubelka-Munk theory which is generally used in the field of color recipe is limited in its application since it is difficult to prepare the model that meets all available conditions. Although the conventional Kubelka-Munk theory is widely used in predicting color matches, some assumptions are made which limit the situations where the theory may be applied. It is indeed very difficult to configure a model that supersede the above discussed model.

The utilization of the neural network appears to be an effective technique to remove the difficulty in configuring the substitute model. However, the human vision is too sensitive to allow the neural network to exhibit a required accuracy in predicting small proportions as low as 0.01%.

DISCLOSURE OF THE INVENTION

In view of the foregoing, the present invention is intended to provide an improved proportion predicting system for systematically predicting, with high accuracy, proportion or a mixing ratio at which a plurality of element colors, element light, element sound signals, element electrical signals or element electromagnetic waves are mixed to produce a target material, a target color, target light, a target sound signal, a target electrical signal or a target electromagnetic wave.

The present invention is also intended to provide an improved mixture making method for making the desired target, such as material, color, light, sound signal, electrical signal or electromagnetic wave, having a specification similar to that of the target material, target color, target light, target sound signal, target electrical signal or target electromagnetic wave.

It is to be noted that the term "element" herein used is to be understood as meaning a material, color, light, an acoustic signal, an electric signal or an electromagnetic wave having a variety of physical and/or chemical characteristics having a capability of being mixed and that the term "target" also herein used is to be understood as meaning a material, color, light, an acoustic signal, an electric signal or an electromagnetic wave produced by mixing these elements.

Also, the term "mixing" herein recited is to be understood as meaning not only a direct mixing of physical matter, chemical matter or electric matter, but also a mixing of matter which human sensory organs so perceive even though no direct mixing of matter takes place. By way of example, the mixing of matter which human sensory organs so perceive includes preparation of a mixed color by spatially disposing colored toner particles in a given area at varying proportions by means of, for example, a color printer, or by displaying by means of, for example, a color display, colors at varying intensities of light spatially distributed in the color display.

Accordingly, the term "mixture" herein used is to be understood as meaning material, color, light, acoustic signal, electric signal or electromagnetic wave so prepared by the specific mixing.

According to one aspect of the present invention there is provided a proportion predicting apparatus which includes a proportion characteristic extractor for determining a characteristic of a target, a GA (genetic algorithm) calculator for predicting the proportion or mixing ratio of two or more elements, and an evaluating means for calculating a similarity between two characteristics.

According to another aspect of the present invention there is provided a mixture making method which includes a proportion characteristic extractor for determining a characteristic of a target, a GA (genetic algorithm) calculator for predicting the proportion or mixing ratio of two or more elements, an evaluating means for calculating a similarity between two characteristics and a mixer for mixing the elements together at respective proportions finally calculated by the GA processor.

The evaluating means employed in the present invention includes at least one of a mixture element evaluating section adapted to receive the proportions predicted by the GA processor to evaluate the type of the elements of which proportion is not zero, and/or a mixture characteristic evaluating section for predicting a characteristic of the mixture formed by mixing the elements at the respective proportions and for comparing it with the characteristic of the target.

The mixture element evaluating section of the evaluating means used in the present invention includes at least one of an element number evaluating section and an unnecessary element number evaluating section. The element number evaluating section includes a mixture element number selector adapted to receive the proportions predicted by the GA processor to digitalize the predicated proportions, a mixture element predictor adapted to receive the characteristic extracted by the mixture characteristic extractor to predict the type of elements that form the target, and an element number distance calculator for comparing the element number, obtained from the mixture element number selector for use in mixing, with the element number obtained from the mixture element predictor and for outputting a similarity. On the other hand, the unnecessary element number evaluating section includes a mixture element number selector, a knowledge base in which unnecessary combinations for the mixing are described in the form of knowledge, and a penalty section adapted to receive the element number obtained from the mixture element number selector for use in mixing and for making reference to the knowledge base to lower a fitness in the event of the presence of the unnecessary element number.

The mixture characteristic evaluating section includes a mixture characteristic predictor adapted to receive the predicted proportions calculated by the GA processor and to predict the characteristic of the mixture obtained by mixing the elements at the predicted proportions, and a mixture characteristic distance calculator for comparing the characteristic extracted by the mixture characteristic extractor, with the characteristic of the mixture predicted by the mixture characteristic predictor and for outputting a similarity.

The GA processor used in the present invention includes a GA initial value determining section for determining initial values for predicting the proportions according to the genetic algorithm, and a dynamic GA processor for sequentially determining the proportions. The GA initial value determining section includes at least an initial proportion value determining section adapted to receive the characteristic of the target and to predict the proportions which are then rendered to be initial values.

The GA initial value determining section referred to above may include at least an initial proportion value determining means for receiving the characteristic of the target to predict the proportions which are then rendered to be respective initial values, a knowledge base concerning combinations of the elements, and a multi-elite generator for comparing an output from the initial proportion value determining means with the knowledge to formulate new initial values of the GA processor by replacing proportions of unnecessary element candidates with zero.

Alternatively, the GA initial value determining section may includes a color space characteristic extractor for outputting coordinates in a color space such as L*-a*-b* of the color of the target, a color space classifier adapted to receive the coordinates in the color space obtained by the color space characteristic extractor to determine which representative color area the color of the target is included, a knowledge base in which knowledge concerning combinations of colors of the elements are described, a random initial value generator for outputting random proportions, and a random initial value corrector adapted to receive the proportion generated by the random initial value generator and information on the representative color area determined by the color space classifier and operable to make a search in the knowledge base to determine if an improper color combination in the color area is included in a random value of the proportion obtained from the random initial value and to correct the improper random proportion.

According to the present invention, in order to prepare the mixture having a characteristic substantially identical with that of the given target, the characteristic of the given target is first determined by the mixture characteristic extractor. Such a characteristic may be, in the case of sound or color, a physical characteristic such as a spectrum. The GA processor then predicts, on the basis of the genetic algorithm, the mixing ratio of the mixture of a specification formulated by mixing two or more elements. The evaluating means compares the characteristic determined by the mixture characteristic extractor with the characteristic of the mixture which may eventually prepared by mixing the elements at the respective proportions predicted by the Ga calculator and also evaluates the degree of accuracy of the proportions predicted by the GA processor. The proportion predictor is comprised of the above described mixture characteristic extractor, the GA processor and the evaluating means. The mixer serves to mix the elements at the respective predicted proportions to provide the mixture.

The GA processor utilizes as the respective initial values the proportions determined by the initial value determining section so that the accuracy of prediction of the mixing ratio can be progressively increased on the basis of the genetic algorithm.

Also, in order to evaluate the validity of the proportions predicted by the GA processor, the evaluating means output a result of evaluation obtained by the built-in element number evaluating section, the unnecessary element number evaluating section or the mixture characteristic evaluating section. The element number evaluating section is comprised of the mixture element number selector, the mixture element predictor and the element number distance calculator. The mixture element number selector is operable, in response to the proportions predicated by the GA processor, to digitalize the predicted mixing ratio, that is, to render the predicted proportions to be OFF if they are lower than a predetermined threshold value, but ON if they are higher than the predetermined threshold.

The mixture element predictor receives the characteristic extracted by the mixture characteristic extractor so that the type of the elements forming the target can be predicted. The element number distance calculator compares the element number, which is obtained from the mixture element number selector and which is used in mixing, with the element number obtained by the mixture element predictor and them outputs a similarity between them.

The unnecessary element number evaluating section is comprised of the mixture element number selector, the knowledge base and the penalty section. The knowledge base has knowledge necessary to eliminate redundant elements, whereas the penalty section receives the element number obtained from the mixture element number selector for use in mixing and refers to the knowledge base so that the fitness can be lowered in the event of the presence of the unnecessary element combinations.

The mixture characteristic evaluating section is comprised of the mixture characteristic predictor and the mixture characteristic distance calculator. The mixture characteristic predictor receives the proportions predicted by the GA processor and predicts the characteristic of the mixture which is obtained by mixing the elements at the respective predicted proportions. The mixture characteristic distance calculator compares the characteristic obtained by the mixture characteristic extractor with the characteristic of the mixture obtained by the mixture characteristic predictor and then provides an output indicative of similarity between them.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

BEST MODE FOR CARRYING OUT THE INVENTION

In describing some preferred embodiments of the present invention, the present invention will be described as applied to colorant proportion prediction, that is, prediction of the mixing ratio of colorants to be mixed to produce a desired color, as is the case with the prior art hereinbefore discussed.

Figure 1:
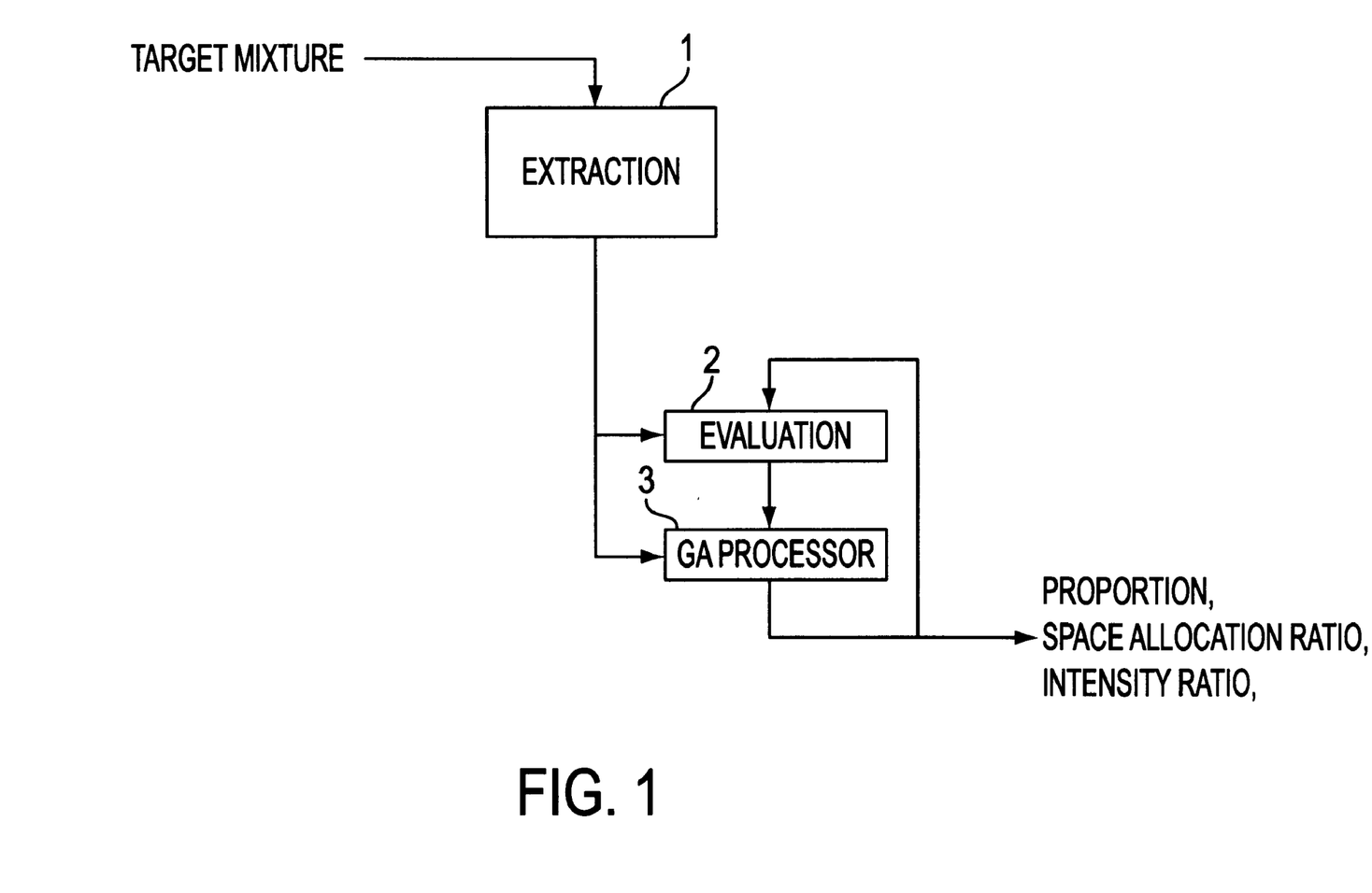
FIG. 1 is a block diagram showing a proportion predicting apparatus according to the present invention.

Referring first to FIG. 1, there is shown a schematic block representation of a proportion predicting system according to one preferred embodiment of the present invention. The proportion predicting system shown therein comprises a mixture characteristic extractor 1, an evaluating unit 2 and a GA (genetic algorithm) processor 3.

Figure 2:
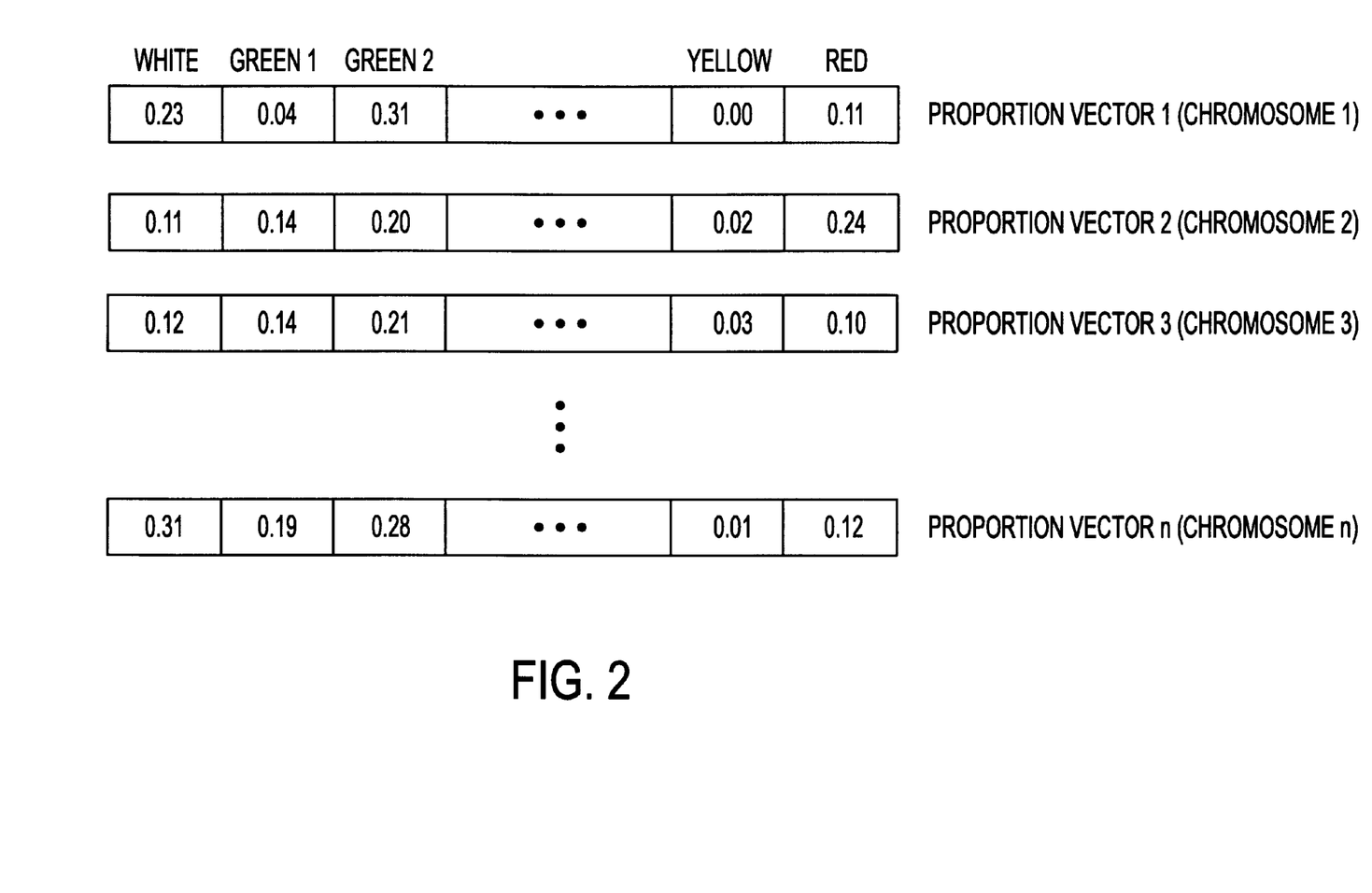
FIG. 2 is a block diagram showing an output of a GA processor used in the apparatus of the present invention.

Assuming that the color of a target paint is specified according to a specification, the mixture characteristic extractor 1 analyzes and output a color spectrum of the target color. Although the spectrum represents physical properties continuously appearing on the axis of frequency, in most cases the spectrum is expressed in terms of n values using n filter banks and n discrete Fourier transforms. The GA processor 3 makes use of a genetic algorithm (GA) to predicate how to mix m element pigments (m being greater than 1) in a particular mixing ratio to produce the target color. FIG. 2 illustrates examples of mixing ratios or proportions of the m element pigments which have been predicted by the GA processor 3, and those mixing ratios are outputted from the GA processor 3. The genetic algorithm referred to above is well known to those skilled in the art and is discussed in, for example, D. E. Goldberg's "Genetic Algorithms in Search, Optimization and Machine Learning" (Addison-Wesley, 1989) and "Handbook of Genetic Algorithms" edited by L. Davis (van Nostrand Reinhold, 1990).

The evaluating unit 2 compares information on the target color fed from the mixture characteristic extractor 1 with the predicted proportion fed from the GA processor 3 to determine, and then outputs a fitness (or an evaluated value) descriptive of, the degree of accuracy of the predicted proportion, that is, the degree of color match between the target color and the color represented by the predicted proportion. The GA processor 3 makes use of the output value from the evaluating unit 2 to progressively increase the degree of accuracy of the predicted proportion according to the genetic algorithm.

Figure 3:
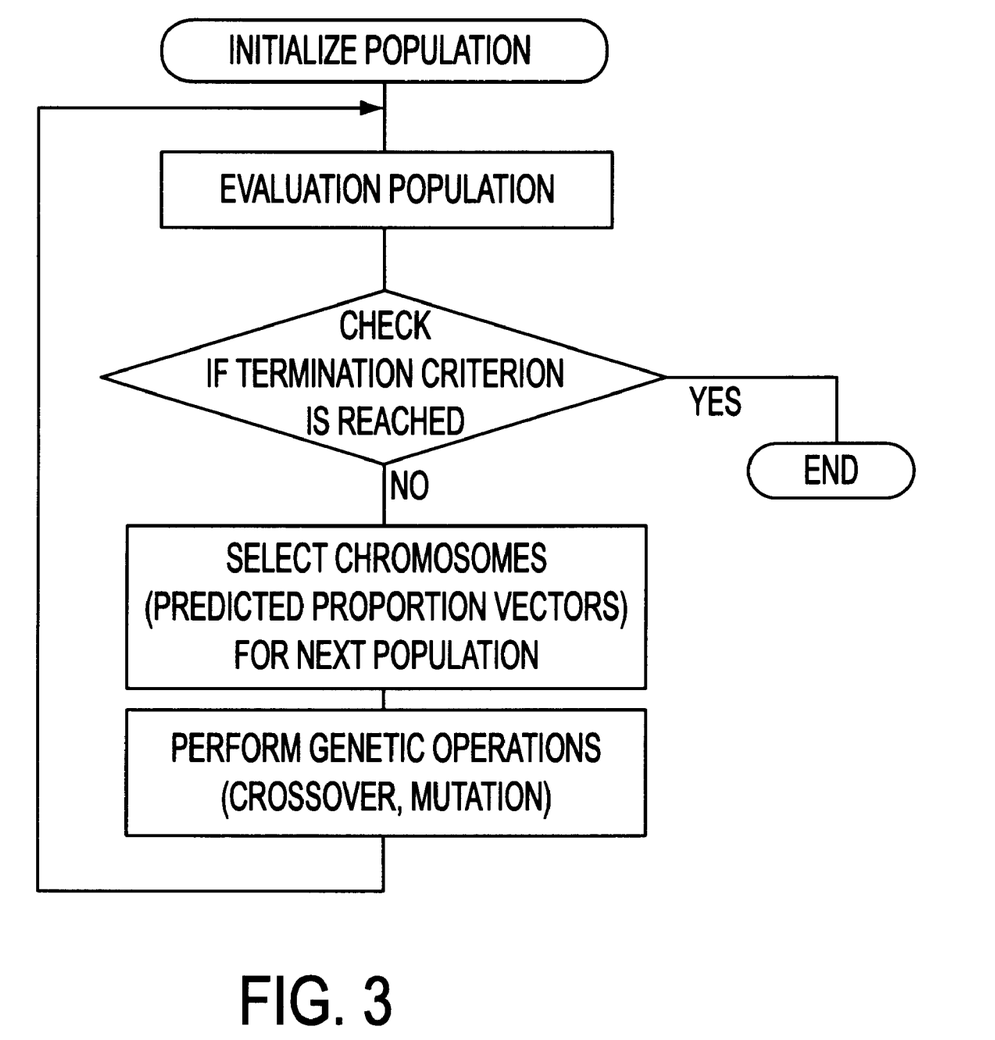
FIG. 3 is a flowchart showing a genetic algorithm employed in the practice of the present invention.

Referring to FIGS. 2 and 3, the GA processor 3 operates according to the genetic algorithm, and proportion vectors to be predicted by the GA processor 3 are treated as n chromosomes of the genetic algorithm such as shown in FIG. 2. Assuming that the number of types of the element pigments is m, the proportion vectors to be predicted represent an m-order vector. In the case of the proportion vector 1 shown in FIG. 2, it means that m element pigments, i.e., white, green-1, green-2, yellow and red pigments are mixed in a proportion of 0.23, 0.04, 0.31, 0 and 0.11, respectively. Since the genetic algorithm is so designed as to make a search with the use of the plural chromosomes such as shown in FIG. 2, the GA processor 3 deals with the correspondingly plural proportion vectors and successively increases their accuracy of prediction.

FIG. 3 illustrates a flowchart showing how the accuracy of prediction of the proportions predicted by the GA processor 3 is increased. The flowchart shown in FIG. 3 is based on the genetic algorithm. As shown therein, in the GA processor 3 the n chromosomes, that is, the proportions, are first initialized. The simplest conventional initializing method is to initialize them with random values. However, according to a different embodiment of the present invention, the initializing method is uniquely designed as will be described later. The proportions so initialized are supplied to the evaluating unit 2. As a matter of course, the accuracy of prediction of the proportions done at the first cycle may not be high and, therefore, the evaluating unit 2 may not give a high fitness to the n proportion vectors. The m fitnesses (evaluated values) are again fed back to the GA processor 3 which then select a number of predicted proportion vectors which were given a high fitness according to the m fitnesses so fed back to the Ga processor 3. The proportion vectors selected by the GA processor 3 represent parents that produce offspring proportion vectors of the succeeding generation. According to the genetic algorithm this process is referred to as selection. The next step is to cross over two predicted proportion vectors arbitrarily chosen from the selected parent proportion vectors to thereby provide predicted proportion vectors of the next succeeding generation. This process is carried out by crossover operation to combine the two m-order proportion vectors to produce different two m-order proportion vectors. The simplest one-point crossover will now be discussed as an example.

Let it be assumed that the two m-order proportion vectors are represented by chromosomes a and b. The one-point crossover is a calculation to produce first offspring proportion vectors from an r-order element of the first half of the chromosome a and a (m-r)-order element of the latter half of the chromosome b and to produce second offspring proportion vectors from an r-order element of the first half of the chromosome b and a (m-r)-order element of the latter half o the chromosome a, wherein 0<r<m. This crossover is referred to as the one-point crossover since offsprings are produced by changing the elements at a boundary between the r-order and the next succeeding (r+1) order from the beginning. By repeating this cross-over, n proportion vectors of the second generation are produced. Calculation performed at the end of the genetic algorithm is referred to as mutation in which random values are added to values descriptive of the proportions of arbitrarily chosen element of the arbitrarily chosen chromosomes. Considering the search, this mutation corresponds to a general search for preventing the proportions from falling into local minimum. The n chromosomes obtained by the foregoing process of selection, crossover and mutation represent the proportion vectors of the second generation. Those proportion vectors of the second generation are again fed back to the evaluating unit 2, thereby repeating the process flow shown in FIG. 3. The process flow shown in FIG. 3 terminates when the accuracy of prediction of the predicted proportions increases to a required accuracy. Functions of various component parts of the GA processor 3 will be described later.

Figure 4:
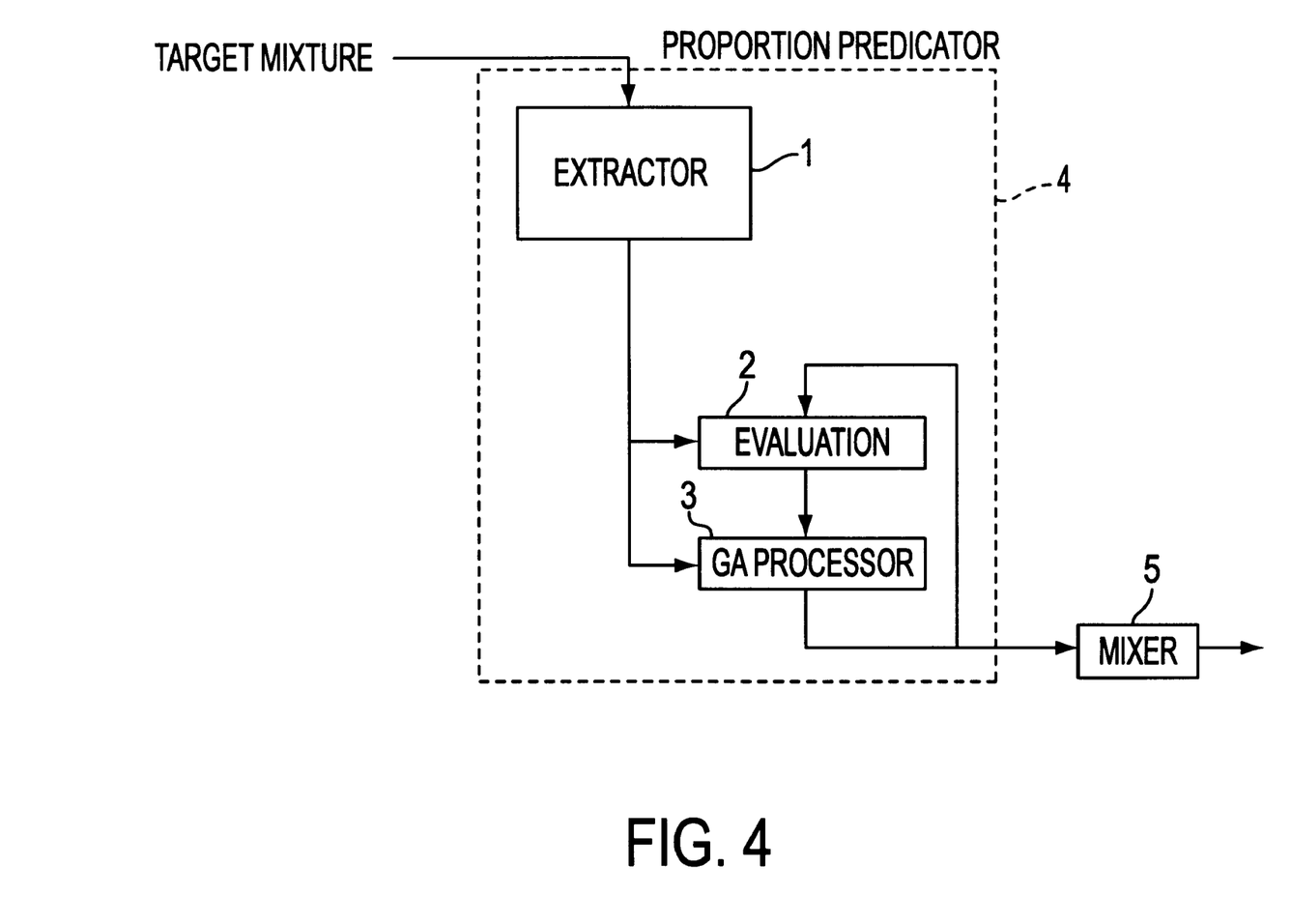
FIG. 4 is a block diagram showing a method of making a mixture according to the present invention.

Referring now to FIG. 4, there is shown a method of preparing a mixture according to one preferred embodiment of the present invention. In FIG. 4, reference numeral 4 represents a proportion predicator and reference numeral 5 represents a mixer. The proportion predicator 4 is comprised of the mixture characteristic extractor 1, the evaluating unit 2 and the GA processor 3 all shown in and described with reference to FIG. 1 and has a function identical with that of the proportion predicting system shown in FIG. 1. The mixer 5 operates to mix m element pigments at the proportion determined by the proportion predicator 4. Functions of various components will be described in further detail hereinafter.

Figure 5:
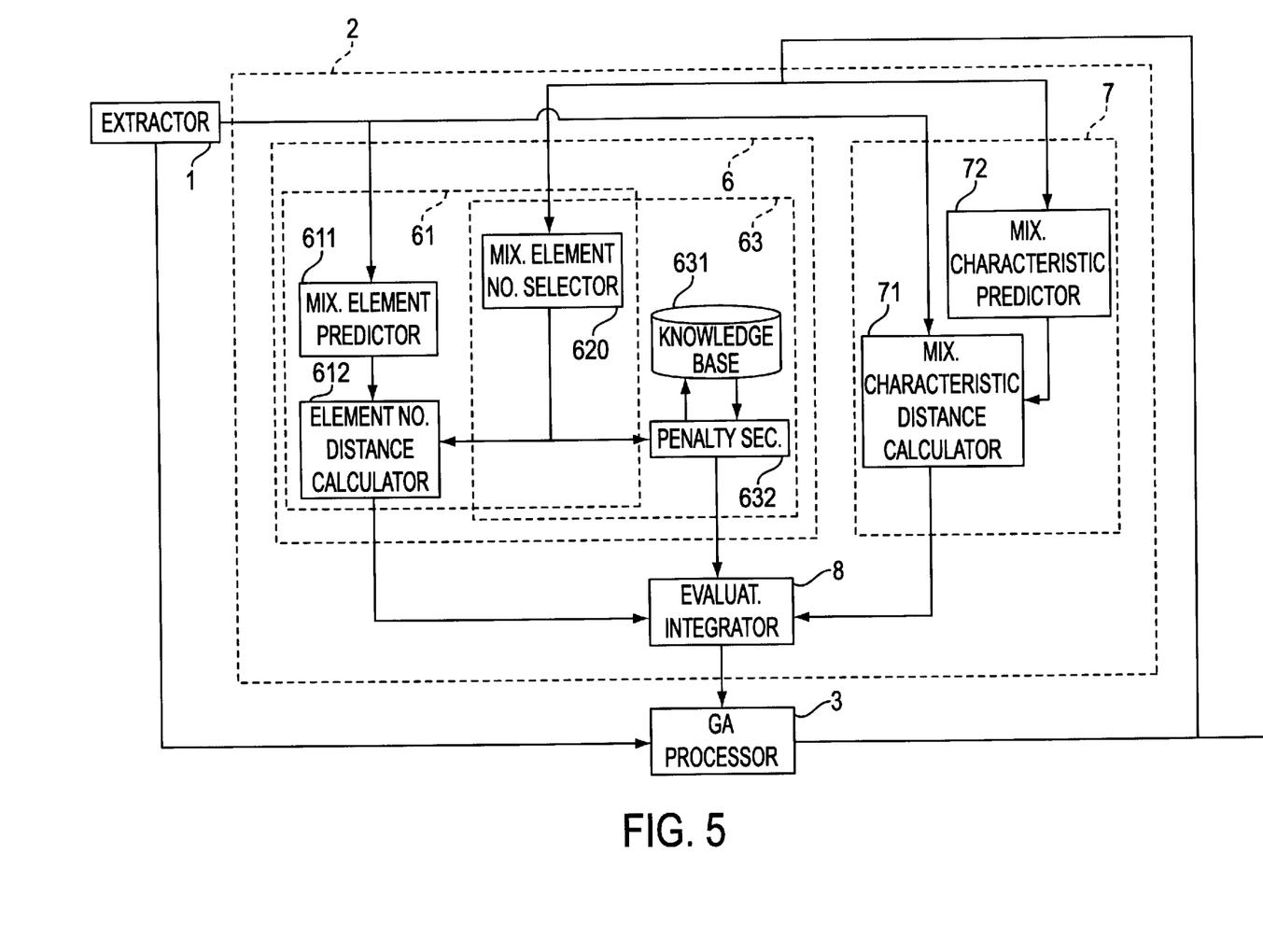
FIG. 5 is a block diagram showing the details of an evaluating means used in the apparatus of the present invention.

FIG. 5 illustrates one embodiment of the evaluating unit 2 employed in the practice of the present invention. The evaluating unit 2 comprises a mixture element evaluating unit 6, a mixture characteristic evaluating unit 7, and a fitness integrator 8. The mixture element evaluating unit 7 shown therein performs evaluation from two viewpoints. This mixture element evaluating unit 6 includes an element number evaluating section 61, and an element number unnecessity evaluating section 63. The mixture element evaluating unit 6 evaluates what element pigments are to be mixed together. In other words, this mixture element evaluating unit 6 serves to convert the proportion predicted by the GA processor 3 into one of binary information (ON or OFF) indicative of whether the element pigments are to be mixed or whether they are not to be mixed and compare it with physical characteristics of the target color. In one preferred embodiment of the present invention, a circuit structure including the element number evaluating section 61 and the element number unnecessity evaluating section 63 performs a specific evaluation. On the other hand, the mixture characteristic evaluating unit 7 evaluates the value of the proportion predicted by the GA processor 3. The fitness integrator 8 serves to apply a weight on each of a plurality of fitnesses and then to sum them together so that one fitness can be outputted therefrom as an output from the evaluating unit 2. The simplest weighing method is to apply an equal weight.

The element number evaluating section 61 shown in FIG. 5 includes a mixture element number selector 620, a mixture element predicator 611 and an element number distance calculator 612. The element number evaluating section 61 of the construction described above functions in the following manner. The mixture element number selector 620 receives the proportions, such as shown in FIG. 2, which have been predicted by the GA processor 3 and converts them into one of binary digits consisting of OFF information, representing that the element pigments at a proportion lower than a threshold value are not mixed, and ON information representing that the element pigments at any other proportion are mixed together. The threshold value referred to above is determined in consideration of the visual perceptibility of whether one can perceive a difference when the element pigments are mixed, and the accuracy of prediction of the GA processor 3. On the other hand, the mixture element predicator 611 makes use of a color spectrum obtained from the mixture characteristic extractor 1 to directly predicate which element pigments are to be mixed together.

Figure 6:
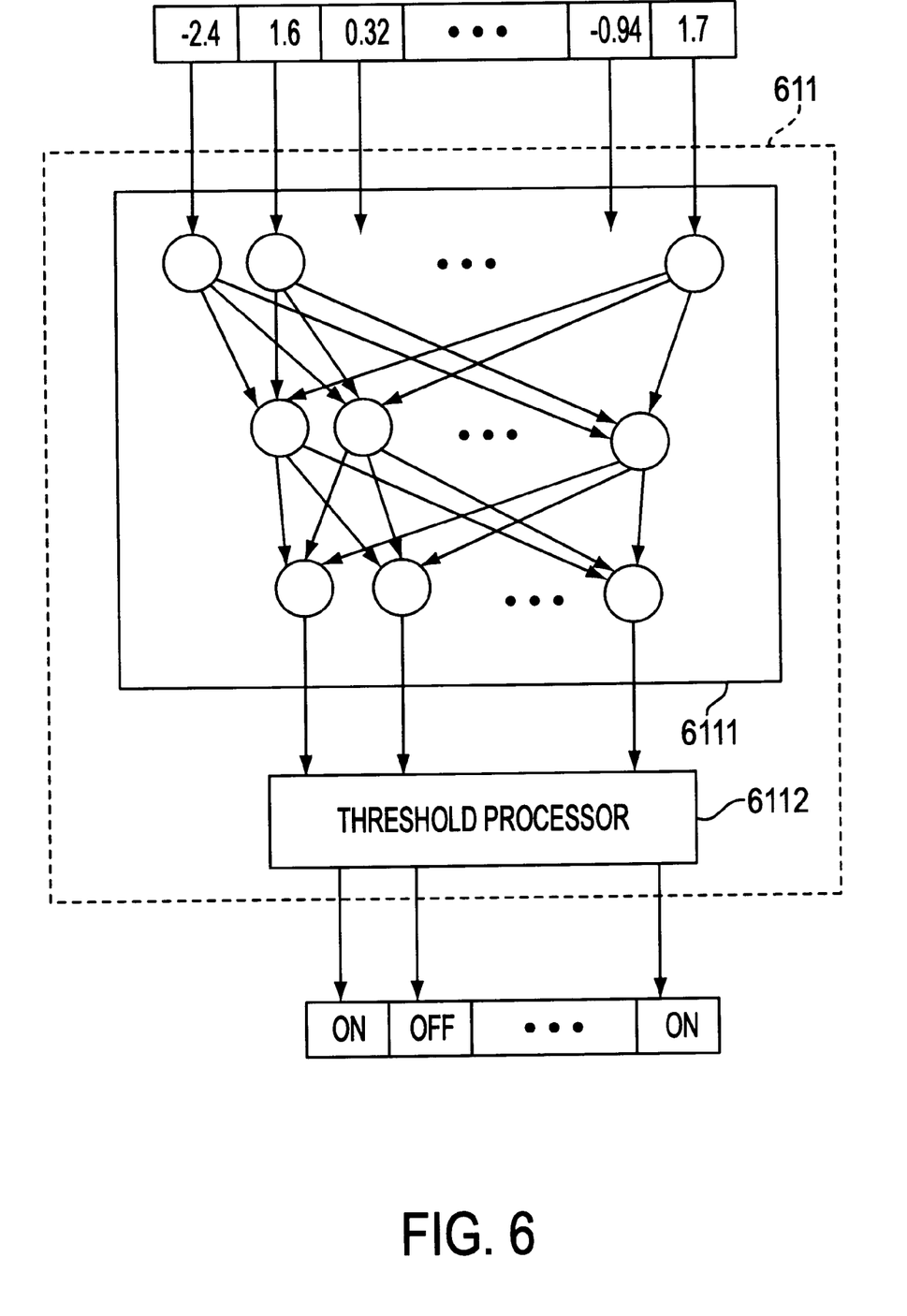
FIG. 6 is a block diagram showing the details of a mixture element predictor used in the apparatus of the present invention.

FIG. 6 illustrates an example in which the mixture element predicator 611 is implemented by a neural network. In FIG. 6, reference numeral 6111 represents a characteristic-element number converter and reference numeral 6112 represents a threshold processor. The characteristic-element number converter 6111 is in the form of a neural network of a three-layered fed-forward type and is adapted to receive the n-order color spectrum obtained by the mixture characteristic extractor 1 so that either an ON output for mixing the m-order element pigments or an OFF output for not mixing the m-order element pigments can be outputted therefrom. The neural network for the characteristic-element number converter 6111 acquires knowledge from a ready-made training data set. The element pigments are beforehand mixed together to provide a paint of a representative color which is subsequently subjected to colorimetric measurement to determine the color spectrum of the resultant paint. In such case, since the element pigments which have been mixed together are known, an accurate relationship between the color spectrum and the m-order ON or OFF information can be obtained. This information is used as a teacher's signal in allowing the neural network to acquire knowledge. Various learning algorithms for the neural network have hitherto been suggested and, if, for example, the widely used backpropagation learning rule that is most largely employed is employed, the characteristic-element number converter 6111 can easily be implemented. In practice, however, even if the neural network is taught to output one of binary digits, 0 or 1, it will not output a complete 0 or 1 and rather 0.001 or 0.998 since an output layer of the neural network make use of a continuous function such as a sigmoid function. The threshold processor 6112 serves to digitalize these values. The threshold processor 6112 compares the characteristic-element number converter 6111 with a predetermined threshold set in it to forcibly convert the output of the neural network into one of the ON and OFF signals. By way of example, the ON and OFF signals are outputted from the threshold processor 6112 if the value is greater than 0.5 and smaller than 0.5, respectively.

The element number distance calculator 612 operates to make a comparison between the information of which element pigments are to be mixed in the light of the color spectrum of the target paint obtained from the mixture element predicator 611 and the information of which element pigments are to be mixed in the light of the predicted proportion obtained from the mixture element number selector 620 and then to provide an output indicative of the degree of difference between these pieces of information. The element number distance calculator 612 determines two m-order binary vector distances. The simplest method of accomplishing this is to calculate the number of bits that are different. This distance is then fed to the fitness integrator 8.

Another specific example of the mixture element evaluating unit 6 is the element number unnecessity evaluating section 63. The element number unnecessity evaluating section 63 shown in FIG. 5 includes the mixture element number selector 620, a knowledge base 631 and a penalty calculator 632. The element number unnecessity evaluating section 63 of the above described construction operates in the following manner.

The penalty calculator 632 is adapted to receive from the mixture element number selector 620 information on which element pigments to be mixed together and makes access to the knowledge base 631 to determine if a combination of the element pigments inputted from the mixture element number selector 620 is unacceptable or unnatural. The knowledge base 631 stores therein knowledge associated with the color combination such as, for example:

Rule 1: Avoid use of complementary color pigments, e.g., red and green pigments, Rule 2: Avoid use of the same color pigments, e.g., green-1 and green-2 pigments, and Rule 3: Keep the proportion about 100%.

The penalty calculator 632 generates evaluated values depending on to what extent the predicted proportion obeys these rules.

A portion of the evaluating unit 2 in which a third important evaluation is carried out is the mixture characteristic evaluating unit 7. As shown therein, this mixture characteristic evaluating unit 7 includes a mixture characteristic distance predictor 72 which operates to interpret, on the basis of the proportion predicted by the GA processor 3, perceived attributes of the predicted color, e.g., coordinates of the L*-a*-b* values in the CIE 1976 (x,y)-chromaticity diagram. It is to be noted that L*, a* and b* represent lightness, hue and chroma. This mixture characteristic distance calculator 71 receives the target coordinates of the L*-a*-b* from the mixture characteristic extractor 1 and calculates the color distance, Euclidean distance, between the two m-order proportion vectors in the L*-a*-b* space. The L*, a* and b* values are calculated from the surface spectral reflectance.

Figure 7:
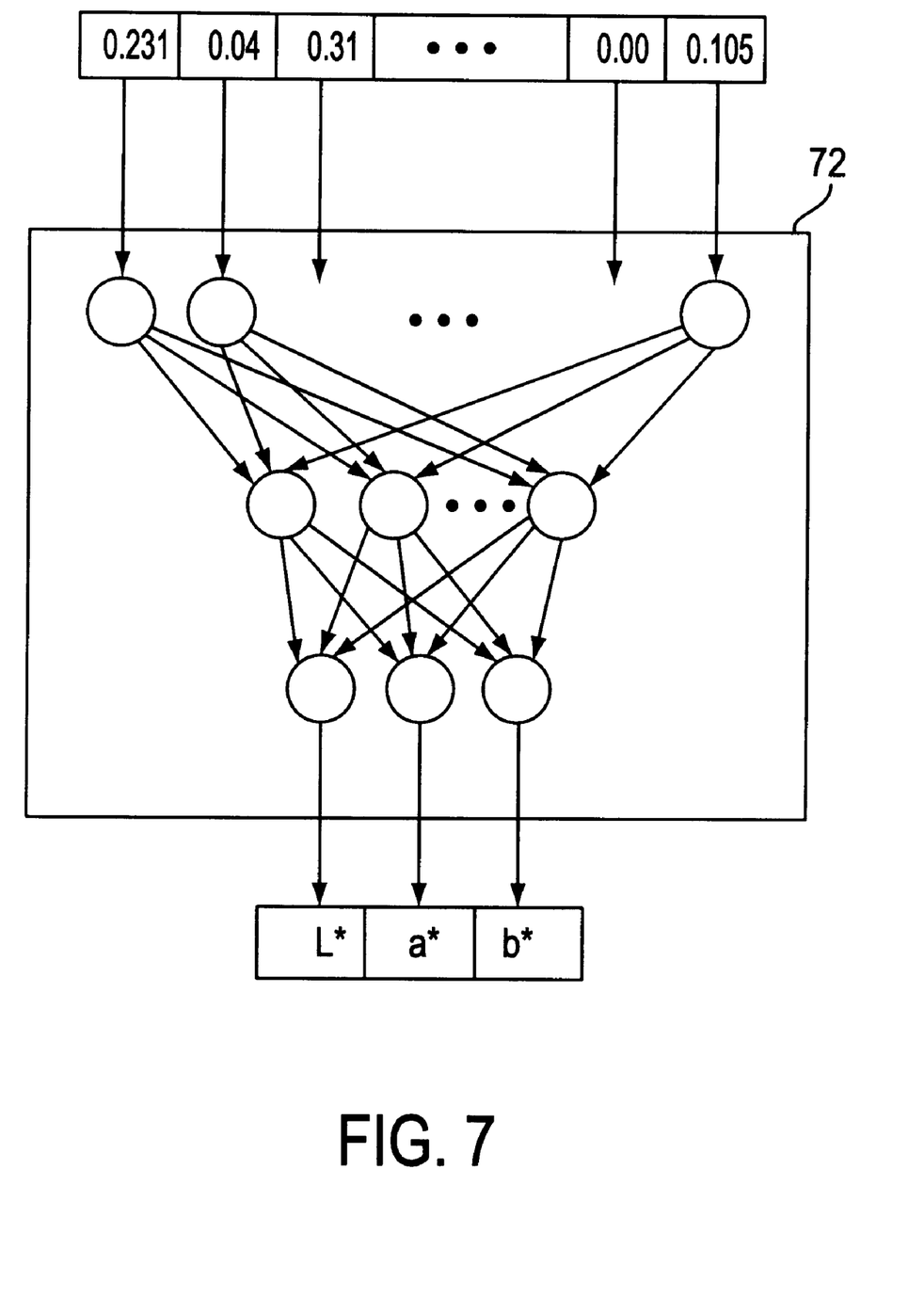
FIG. 7 is a block diagram showing the details of a mixture characteristic predictor used in the apparatus of the present invention.

It is difficult to attain a high accuracy in mapping the proportions to L*-a*-b*. FIG. 7 shows a method of acquiring the mapping by means of a learning function of the neural network. Training data for this purpose can be obtained in a manner similar to the training data for the neural network shown in FIG. 6. The element pigments are beforehand mixed together to provide a paint of a representative color which is subsequently subjected to colorimetric measurement to determine the color spectrum of the resultant paint. Once the color spectrum has been analyzed, conversion of the color space coordinates is easy to achieve. Accordingly, the relationship between the proportion of the element pigments and the color space coordinates is available beforehand and this is used as a training data for the neural network of a mixture characteristic predicator 72. The color of the paint obtained when the element pigments have been mixed according to the proportion predicted by the GA processor 3 and the color of the target paint are converted into the distance in the color space which is subsequently fed to the fitness integrator 8.

In this way, the evaluating unit 2 evaluates the accuracy of the proportion predicted by the GA processor 3. The evaluation is fed back to the GA processor 3. In the above description, the evaluating unit 2 has three components, i.e., the element number evaluating section 61, the element number unnecessity evaluating section 63 and the mixture characteristic evaluating unit 7 to perform evaluation, the use of only one of them is sufficient for the evaluating unit 2 to perform evaluation. However, the use of the three components for the evaluating unit 2 is advantageous in that a higher accuracy can be expected, but the use of these components in combination is not always essential. (See the Table below.)

When a paint is prepared by mixing the element pigments, no one can see what color it will present unless they are actually mixed together. However, occasional preparation of a mixture of the element pigments so that the resultant paint may represent a color matching with that of the target paint requires a substantial amount of time and also involves a problem associated with economy. Three evaluating methods carried out by the evaluating unit 2 provides a solution to this problem and, specifically, by predicting the color which would be given by mixing the element pigments, computer-simulated color match can be achieved steadily with the target paint.

Figure 8:
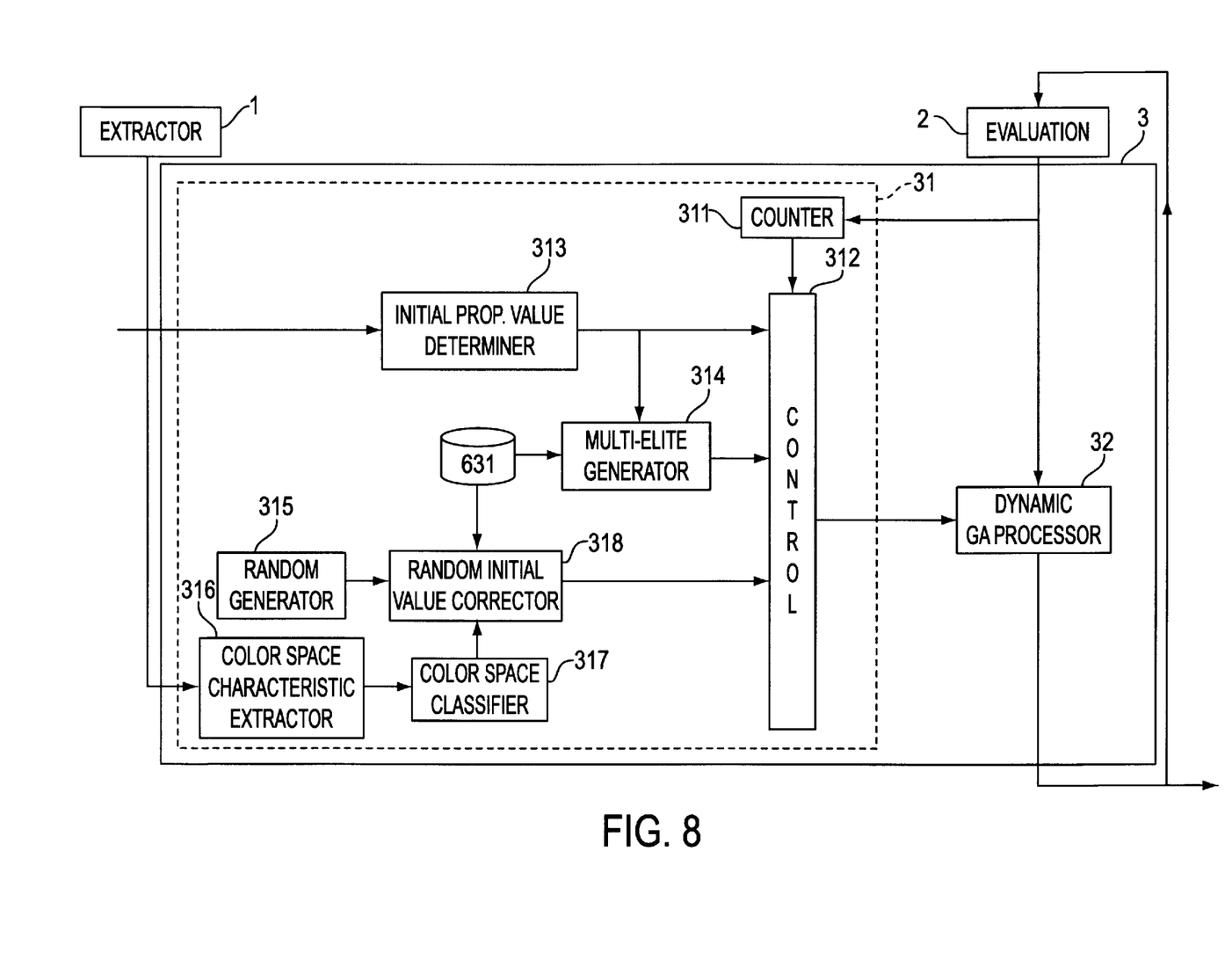
FIG. 8 is a block diagram showing the details of the Ga calculator used in the apparatus of the present invention.

FIG. 8 illustrates the structure of the GA processor 3 according to one preferred embodiment of the present invention. Referring now to FIG. 8, the GA processor 3 includes an initial value determining unit 31 and a dynamic GA determining unit 32. The GA processor 3 operates in the following manner according to the genetic algorithm. Since the genetic algorithm is widely employed in the art, terms "population size", "chromosome", "gene" and so on which are used in association with the genetic algorithm are herein used with no definition given as they are believed to be well understood by those skilled in the art. Chromosomes outputted from the GA processor 3 are shown in the diagram. Proportions, that is, the mixing ratios, of the m element pigments combined in the chromosomes correspond respectively to m genes. According to the genetic algorithm, n such chromosomes are prepared, wherein n represents the population size. At the outset, the genes of each of the n chromosomes are initialized by the initial value determining unit 31, causing the GA processor 3 to output an initial output. The initial value determining unit 31 operates only one time at the outset. Values of the chromosomes evaluated by the evaluating unit 2 are returned to the GA processor 3. The dynamic GA determining unit 32 performs, on the basis of the fitnesses, a genetic operations (selection, crossover and mutation) according to the genetic algorithm to produce n chromosomes of the next generation. The chromosomes (that is, predicted proportions) so produced are outputted from the GA processor 3. The dynamic GA determining unit 32 repeats this procedure. Thus, the dynamic GA determining unit 32 plays an important role of the GA processor 3.

However, even though the GA processor 3 operates according to the same genetic algorithm, the performance of predicting the proportion done by the GA processor 3 depending on the initial value determined by the initial value determining unit 31. Hereinafter, the structure and the operation of the initial value determining unit 31 will be discussed. Referring to FIG. 8, the initial value determining unit 31 includes a counter 311, a control unit 312, an initial proportion determiner 313, a multi-elite generator 314, a random initial value generator 315, a color space characteristic extractor 316, a color space classifier 317 and a random initial value corrector 318.

The initial value determining unit 31 of the construction described above carries out an efficient initialization using three methods such as hitherto carried out in the genetic algorithm.

The first initialization is carried out in the initial proportion determiner 313 which is adapted to receive from the mixture characteristic extractor 1 information on the color spectrum of the target paint and to output the proportion, that is, the mixing ratio, of the element pigments. The initial proportion determiner 313 itself may be said to be a proportion predicting apparatus and can be implemented by a neural network. Such a neural network is reported in the Bishop et al. paper hereinbefore discussed in connection with the prior art and can be implemented in a fashion similar to the neural network shown in any one of FIGS. 6 and 7. As shown by experimental data as will be discussed later, the initial proportion determiner 313 alone does not provide a sufficient prediction. However, the output from the initial proportion value determining unit 313 may be expected to be close to the proportion to be eventually predicted by the proportion predicting apparatus as compared with the random value used for initialization during execution of the standard genetic algorithm. Accordingly, if the predicted proportion obtained from the initial proportion determiner 313 is used in the proportion predicting system of the present invention as the initial value, the predicting performance can be increased.

The second initialization is carried out in the initial proportion determiner 313, the knowledge base 631 and the multi-elite generator 314. With the initial proportion determiner 313, a single initial value of a good birth can be obtained. However, the initial proportion determiner 313 fails to take into consideration a relationship between the complementary color and the same color and the predicted proportion descriptive of how and what element pigments are to be mixed often contains unnecessary and/or useless combinations of the element pigments. The multi-elite generator 314 is adapted to receive the predicted proportion from the initial proportion determiner 313 and outputs a predicted proportion of a good birth different from the output from the initial proportion determiner 313 by making access to knowledge on the color combination described in the knowledge base 631 so that the proportion of the element pigments can be rendered to be zero (that is, these element pigments should not be mixed together) in the event that the predicted proportion contains an unnecessary and/or useless combination of the element pigments. The multi-elite generator 314 serves to provide better starting points for genetic search.

Figure 9:
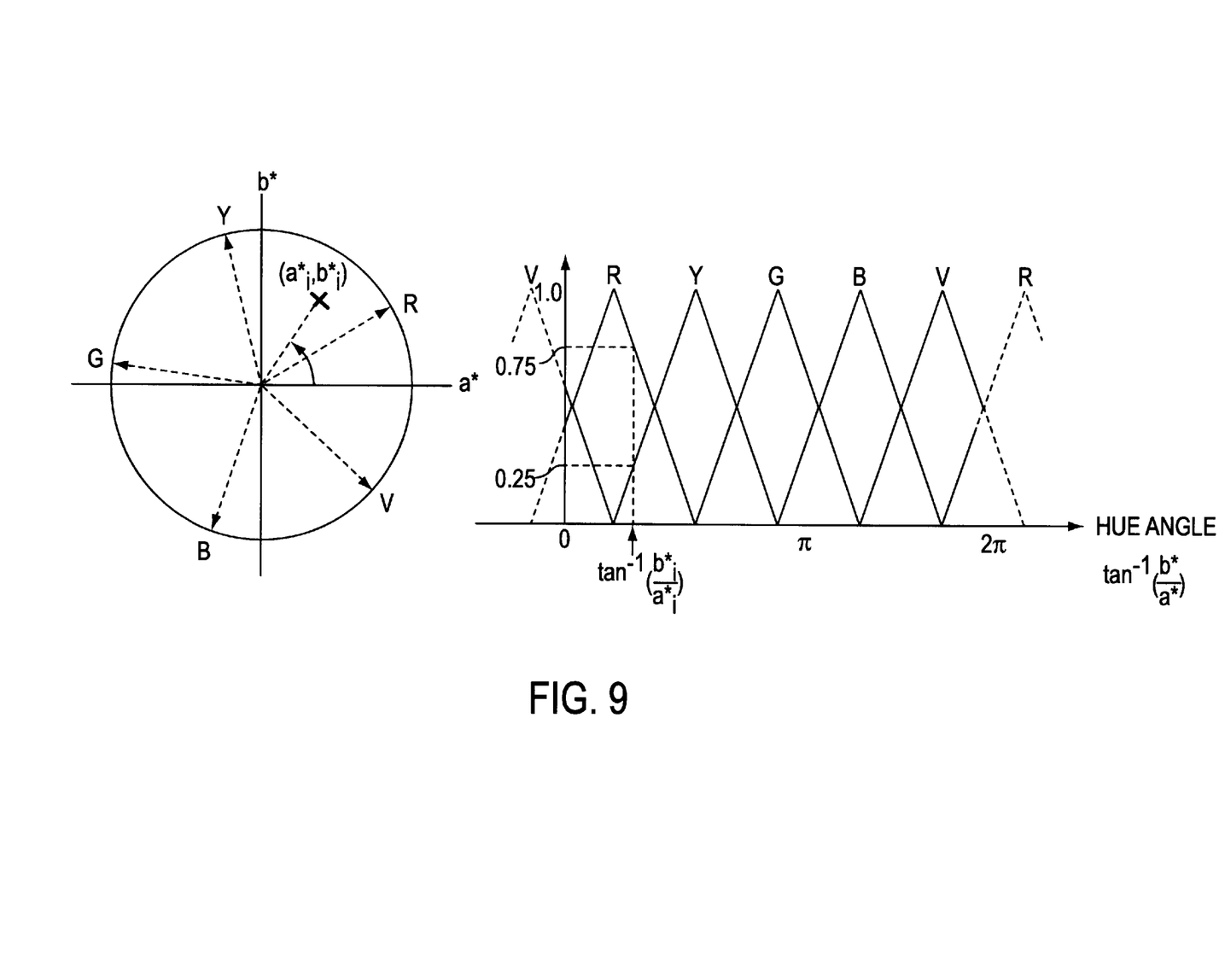
FIG. 9 is an explanatory diagram showing a a*-b* color space and a fuzzy-classification of the a*-b* color space.

The third initialization is carried out in the random initial value generator 315, the color space characteristic extractor 316, the color space classifier 317, the random initial value corrector 318 and the knowledge base 631. The random initial value generator 315 randomly outputs proportions in a manner similar to the random initial value generator used for initialization of the standard genetic algorithm. The color space characteristic extractor 316 performs calculation to determine the coordinates of the color space such as the L*-a*-b* space from the spectrum of the target color. The color space classifier 317 divides or classifies the color space into representative color areas and provides an output descriptive of the extent to which the coordinates of the color space obtained from the color space characteristic extractor 316 belongs to what representative color area divided by such classifier 317. FIG. 9 illustrates an example in which the two dimensional a*-b* space is projected into the hue angle $\tan^{-1}(b^*/a^*)$ and the hue angle is fuzzy-classified into five representative color areas, i.e., red (R), yellow (Y), green (G), blue (B) and violet (V) color areas. Triangles in FIG. 9 define respective degrees of belonging in correspondence with the hue angles of red (R) to violet (V).

The color varies continuously and the degree of belonging progressively shifts from a certain representative color area to the next one with change in hue angle. FIG. 9 also illustrates an output generated from the color space classifier 317 when one color space coordinate $(a^*_i, b^*_i)$ is obtained from the color space characteristic extractor 316. The color space classifier 317 provides an output indicating that, in the case of the hue angle $\tan^{-1}(b^*_i/a^*_i)$ for this coordinates, 0.75 and 0.25 belong to the red and yellow color areas, respectively, but not to any other color areas. The random initial value corrector 318 receives this degree of belonging and also the random initial value for the proportion of the element pigments from the random initial value generator 315. Then, the random initial value corrector 318 refers to the degree of belonging to the representative color obtained from the color space classifier 317 and the knowledge of the color combination obtained from the knowledge base 631 in order to modify the randomly generated proportions. By way of example, where the color represent predominantly red, but shifts to a yellow area to some extent, the random initial value corrector 318 forcibly renders green proportions to be zero because of the red-green complementary color relationship, and renders to zero value either red-1 or red-2 proportion.

The foregoing three initializations are controlled by the counter 311 and the control unit 312. The counter 311 is initialized to zero. The control unit 312 operates only when the count of the counter 311 reads zero. In other words, the population is initialized by the initial proportion determiner 313, the multi-elite generator 314 and the random initial value corrector 318. Since the random initial value generator 315 can initialize any number, some are initialized at the outset by the initial proportion determiner 313 and then the outputs from the initial proportion determiner 313 are modified by the multi-elite generator 314 according to some rules in the knowledge base 631 while the remainder are initialized by the random initial value corrector 318. While as a matter of course the proportion predicting system and the mixture making method of the present invention work satisfactorily even if the outputs of the random initial value generator 315 only are used for direct initialization as is the case in the standard genetic algorithm, the performance can be expected to be enhanced because of the multiple elites generated by the random initial value corrector 318.

The initial population so formed in the manner described above is fed to the dynamic GA determining unit 32. When the output from the GA processor 3 is returned to the evaluating unit 2 and the value evaluated by the evaluating unit 2 is fed back to the GA processor 3, the count of the counter 311 is incremented by one. Since the count of the counter 311 is no longer zero, initialization of the initial value determining unit 31 takes place only one time at the beginning.

It is to be noted that in the foregoing description the initial value determining unit 31 has been described as constructed to execute the three initialization methods, each method can be expected to give rise to the value of a good birth as compared with the initialization with the random value such as executed in the prior art genetic algorithm. Accordingly, even though the three initialization methods are not realized simultaneously, it is expected that the predicting performance and the manufacturing performance are high as compared with the prior art proportion predicting system and the mixture making method.

Also, although the color space classifier 317 used in the embodiment of the present invention has been shown as operable to fuzzy-classify the color space, similar effects can be obtained even if a crisp division is carried out, since there is a significance in that the initial value of a good birth is determined with the use of the knowledge of each divided color area.

To quantitatively demonstrate the effects of the present invention and the validity of the three components 61, 63 and 7 in the evaluating unit 2, the following five apparatuses (a) to (e) were compared experimentally.

(a) The initial proportion determiner 313 in the form of one neural network. (The proportion predicting apparatus operable to predicate the proportion with the use of the neural network discussed previously in connection with the prior art.)

(b) Proportion predicting apparatus in which the evaluating unit 2 includes only the mixture characteristic evaluating unit 7.

(c) Proportion predicting apparatus in which the evaluating unit 2 includes the mixture characteristic evaluating unit 7 and the element number unnecessity evaluating section 63.

(d) Proportion predicting apparatus in which the evaluating unit 2 includes the mixture characteristic evaluating unit 7 and the element number evaluating section 61.

(e) Proportion predicting apparatus in which the evaluating unit 2 includes all three components: the mixture characteristic evaluating unit 7, the element number unnecessity evaluating section 63 and the element number evaluating section 61.

During the experiments, 92 data randomly chosen from 302 data of the target paints of known formulations were used as test data and each of the apparatuses (a) to (e) was operated to predicate the proportion of the element pigments. Prediction errors of the proportions are shown in the following table.

TABLE

| | (a) | (b) | (c) | (d) | (e) |
|---|---|---|---|---|---|
| Pre.-Error (× 0.01) | 2.000 | 2.433 | 1.919 | 1.288 | 0.657 |

Thus, it is clear that the present invention has brought about superior effects when the evaluating unit 2 has the three components.

Although in the foregoing description the present invention has been described as applied to production of color paint generally matching with the color of the target paint prepared by mixing the element pigments, the present invention should not be limited to production of such a physical mixture and can be equally applicable to mixing of waves such as color, light and sound. Also, although the disclosed embodiments are directed to physical mixtures, the present invention is also applicable to mixture of any matter the human being can percept. By way of example, in the case of color formulation based on visually perceptible mixture such as a color printer, the proportion predicting apparatus of the present invention may operate to predicate the proportion of surface areas of element colors spatially distributed. Also, in the case of color formulation based on the visually perceptible mixture such as a color display, the proportion predicting apparatus of the present invention may operate to predicate the mixing ratio of light intensities of color elements distributed spatially. Similarly, the mixture making method of the present invention may have a number of applications.

INDUSTRIAL APPLICABILITY

As hereinabove described, according to the present invention, the proportion at which the elements are to be mixed to produce the target of a predetermined specification can be predicted with high accuracy, with no need to make an actual mixture of elements. Consequently, a mixture substantially matching with the target of the predetermined specification can be easily prepared. This brings about such advantages that the length of time required to perform the prediction and the manufacture and the associated cost can be reduced. Thus, the present invention has a number of industrial utilities.

What is claimed is:

1. A proportion predicting system for predicting elements to be mixed and their proportions to realize a given target, said system comprising:

a target characteristic extractor for extracting a characteristic of the predetermined target;

an evaluating means operable upon receipt of proportion vectors, which are represented by the characteristic of the predetermined target and the quantity of each of the elements, respectively, to determine fitnesses of the proportion vectors based on the extracted characteristic of the predetermined target; and a GA processor for predicting the proportion vectors on the basis of the fitnesses according to a genetic algorithm in which the quantity of each of the elements and each of the proportion vectors are represented by a gene and a chromosome, respectively;

said proportion vectors, which have been predicted by the GA processor, being inputted to the evaluating means to cause said evaluating means to repeat evaluation of the proportion vectors to determine optimum proportion vectors.

2. The system as claimed in claim 1, wherein said evaluating means is a mixing element evaluating means which receives the proportions predicted by the GA processor to evaluate the type of the elements of which proportions are not zero, on the basis of characteristic values inputted.

3. The system as claimed in claim 2, wherein said mixing element evaluating means includes a proportion element number selector which receives the proportion vectors predicted by the GA processor and operates to digitalize them by comparing them with a predetermined threshold value to thereby select the elements of which proportions are greater than the predetermined threshold value, a mixing element predicator which receives the characteristic extracted by the target characteristic extractor, and an element number distance calculator operable to compare an element number obtained from the mixing element number selector with an element number obtained from the mixing element predicator.

4. The system as claimed in claim 2, wherein said mixing element evaluating means includes a knowledge base in which combinations unnecessary to mixing of the elements are described in the form of pieces of knowledge, and a penalty means which receives the element number to be used in mixing in the mixing element number selector and which refers to the knowledge base to lower the fitness of one of the elements in the event of the presence of the unnecessary combination of the element numbers.

5. The system as claimed in claim 1, wherein said evaluating means is a mixture characteristic evaluating means operable to evaluate a characteristic of a mixture, which is formed by mixing the elements according to the proportion predicted by the GA processor, by comparing the characteristic of the predetermined target inputted.

6. The system as claimed in claim 5, wherein said mixture characteristic evaluating means includes a mixture characteristic predicator operable upon receipt of the proportion vector predicted by the GA processor to predicate the characteristic of the mixture formed by mixing the elements according to the proportion given by the proportion vectors, and a mixture characteristic distance calculator for comparing the characteristic extracted by the mixture characteristic extractor with the characteristic of the mixture obtained from the mixture characteristic predicator and to output a similarity as a fitness.

7. The system as claimed in claim 1, wherein said GA processor includes a GA initial value determining section for determining an initial value for the proportion of each of the elements to be predicted, and a dynamic GA processor operable on a basis of the genetic algorithm to sequentially determine the proportions, and wherein said GA initial value determining section includes at least an initial proportion value determining means adapted to receive the characteristic of the target and operable to set the proportion of the elements forming the target to be an initial value.

8. The system as claimed in claim 1, wherein said GA processor includes a GA initial value determining section for determining an initial value for the proportion of each of the elements to be predicted, and a dynamic GA processor operable on a basis of the genetic algorithm to sequentially determine the proportions, and wherein said GA initial value determining section includes at least an initial proportion value determining means adapted to receive the characteristic of the target and operable to set the proportion of the elements forming the target to be an initial value, a knowledge base in which knowledge concerning combinations of the elements are described, and a multi-elite generator for comparing an output from the initial proportion value determining section with the knowledge in the knowledge base and for setting up new initial values for the GA processor by replacing the proportion of an unnecessary element candidate with zero.

9. The system as claimed in claim 1, wherein said target is a color and wherein said GA processor includes a GA initial value determining section for determining an initial value for the proportions of the elements to be predicted and a dynamic GA processor operable on a basis of the genetic algorithm to sequentially determine the proportions, and wherein said GA initial value determining section includes a color space characteristic extractor for outputting coordinates in a color space such as L*-a*-b* of the color of the target, a color space classifier adapted to receive the coordinates in the color space obtained by the color space characteristic extractor to determine which representative color area the color of the target is included, a knowledge base in which knowledge concerning combinations of colors of the elements are described, a random initial value generator for outputting random proportions, and a random initial value corrector adapted to receive the proportion generated by the random initial value generator and information on the representative color area determined by the color space classifier and operable to make a search in the knowledge base to determine if an improper color combination in the color area is included in a random value of the proportion obtained from the random initial value and to correct the improper random proportion.

10. The system as claimed in claim 9, wherein said color space classifier is operable to fuzzy-classify the color space to provide a plurality of outputs representative of degrees of belonging to one or two or more representative color areas to which the color of a target material and the color of the target belong.

11. The system as claimed in claim 9, wherein said color space classifier is operable to fuzzy-classify the color space to provide a plurality of outputs representative of degrees of belonging to one or two or more representative color areas to which the color of the target belongs, and wherein said random initial value corrector is operable to determine the number of candidates of the initial value proportions given randomly according to the degrees of belonging.

12. A method of preparing a predetermined target by mixing a predetermined number of elements at a predetermined proportion, said method comprising the steps of:
   extracting a characteristic of the predetermined target;
   evaluating proportion vectors having vector elements represented by respective quantities of the elements, on a basis of the extracted characteristic of the target:
   predicting the proportion vectors on the basis of the fitnesses according to a genetic algorithm in which the quantity of each of the elements and each of the proportion vectors are represented by a gene and a chromosome, respectively; and
   determining optimum proportions required to prepare the target by repeating said evaluating and predicting steps.

13. The method as claimed in claim 12, wherein said evaluating step is a mixing element evaluating step which receives the proportions predicted by the GA processor to evaluate the type of the elements of which proportions are not zero, on the basis of characteristic values inputted.

14. The method as claimed in claim 13, wherein said mixing element evaluating step includes a proportion element number selecting step which receives the proportion vectors predicted during the predicting step and operates to digitalize them by comparing them with a predetermined threshold value to thereby select the elements of which proportions are greater than the predetermined threshold value, a mixing element predicting step which receives the extracted characteristic, and an element number distance calculating step for comparing an element number obtained from the mixing element number selector with an element number obtained during the mixing element predicting step.

15. The method as claimed in claim 13, wherein said mixing element evaluating step includes a knowledge base in which combinations unnecessary to mixing of the elements are described in the form of pieces of knowledge, and a penalty step which receives the element number to be used in mixing in the mixing element number selecting step and which refers to the knowledge base to lower the fitness of one of the elements in the event of the presence of the unnecessary combination of the element numbers.

16. The method as claimed in claim 12, wherein said evaluating step is a mixture characteristic evaluating step for evaluating a characteristic of a mixture, which is formed by mixing the elements according to the proportion predicted during the predicting step, by comparing the characteristic of the predetermined target inputted.

17. The method as claimed in claim 16, wherein said mixture characteristic evaluating step includes a mixture characteristic predicting step operable upon receipt of the proportion vector predicted during the predicting step to predicate the characteristic of the mixture formed by mixing the elements according to the proportion given by the proportion vectors, and a mixture characteristic distance calculating step for comparing the characteristic extracted during the mixture characteristic extracting step with the characteristic of the mixture obtained from the mixture characteristic predicator and to output a similarity as a fitness.

18. The method as claimed in claim 12, wherein said predicting step includes a GA initial value determining step for determining an initial value for the proportion of each of the elements to be predicted, and a dynamic GA processing step operable on a basis of the genetic algorithm to sequentially determine the proportions, and wherein said GA initial value determining step includes at least an initial proportion value determining step adapted to receive the characteristic of the target and operable to set the proportion of the elements forming the target to be an initial value.

19. The method as claimed in claim 12, wherein said GA calculating step includes a GA initial value determining step for determining an initial value for the proportion of each of the elements to be predicted, and a dynamic GA processing step operable on a basis of the genetic algorithm to sequentially determine the proportions, and wherein said GA initial value determining step includes at least an initial proportion value determining step adapted to receive the characteristic of the target and operable to set the proportion of the elements forming the target to be an initial value, and a multi-elite generating step for comparing an output from the initial proportion value determining step with the knowledge in the knowledge base, in which knowledge concerning combinations of the elements are described, and for setting up new initial values for the GA calculating step by replacing the proportion of an unnecessary element candidate with zero.

* * * * *